United States Patent
Fernandez

(10) Patent No.: US 11,222,414 B2
(45) Date of Patent: Jan. 11, 2022

(54) IMAGE PROCESSING APPARATUS THAT SPECIFIES A BLOCK TO BE ENCODED

(71) Applicant: CANON KABUSHIKI KAISHA, Tokyo (JP)

(72) Inventor: Michael Loe G. Fernandez, Quezon (PH)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/026,107

(22) Filed: Jul. 3, 2018

(65) Prior Publication Data

US 2019/0012775 A1 Jan. 10, 2019

(30) Foreign Application Priority Data

Jul. 5, 2017 (JP) .............................. JP2017-132260

(51) Int. Cl.
| | |
|---|---|
| G06T 5/00 | (2006.01) |
| G06T 5/40 | (2006.01) |
| G06T 9/00 | (2006.01) |
| G06T 7/11 | (2017.01) |
| H04N 19/129 | (2014.01) |
| H04N 19/176 | (2014.01) |
| H04N 19/167 | (2014.01) |
| H04N 19/119 | (2014.01) |

(52) U.S. Cl.
CPC .................. *G06T 5/40* (2013.01); *G06T 7/11* (2017.01); *G06T 9/004* (2013.01); *H04N 19/129* (2014.11); *H04N 19/167* (2014.11); *H04N 19/176* (2014.11); *G06T 2207/20021* (2013.01); *H04N 19/119* (2014.11)

(58) Field of Classification Search
CPC ... G06T 5/40; G06T 7/11; G06T 9/004; G06T 2207/20021; H04N 19/129; H04N 19/167; H04N 19/176; H04N 19/119
See application file for complete search history.

(56) References Cited

U.S. PATENT DOCUMENTS

| | | | | |
|---|---|---|---|---|
| 2012/0140832 A1* | 6/2012 | Sjoberg | .................. | H04N 19/46 |
| | | | | 375/240.26 |
| 2013/0156111 A1* | 6/2013 | Lee | ........................ | H04N 19/86 |
| | | | | 375/240.24 |
| 2014/0146885 A1* | 5/2014 | Park | ................... | H04N 21/2387 |
| | | | | 375/240.12 |

(Continued)

FOREIGN PATENT DOCUMENTS

JP 2015115903 A 6/2015

OTHER PUBLICATIONS

Copending U.S. Appl. No. 16/026,122, filed Jul. 3, 2018 (a copy is not included because the cited application s not yet available to the public and the Examiner has ready access to the cited application).

(Continued)

*Primary Examiner* — Pakee Fang
(74) *Attorney, Agent, or Firm* — Rossi, Kimms & McDowell LLP

(57) ABSTRACT

A second block to be encoded after a first block, from among a plurality of blocks obtained by recursively dividing an image region in accordance with quadtree spatial splitting, is specified based on a size of the first block. The second block is encoded.

7 Claims, 5 Drawing Sheets

| REFERENCE INFORMATION | X COORDINATE OF MINIMUM CU | Y COORDINATE OF MINIMUM CU |
|---|---|---|
| 0 | 0 | 0 |
| 1 | 8 | 0 |
| 2 | 0 | 8 |
| 3 | 8 | 8 |
| ⋮ | ⋮ | ⋮ |
| 63 | 56 | 56 |

(56) References Cited

U.S. PATENT DOCUMENTS

| | | | |
|---|---|---|---|
| 2014/0226719 A1* | 8/2014 | Yamamoto | H04N 19/91 |
| | | | 375/240.12 |
| 2014/0269924 A1* | 9/2014 | Kim | H04N 19/105 |
| | | | 375/240.16 |
| 2016/0219302 A1 | 7/2016 | Liu | |
| 2017/0339404 A1 | 11/2017 | Panusopone | |
| 2019/0007684 A1* | 1/2019 | Van Der Auwera | H04N 19/82 |
| 2019/0191171 A1 | 6/2019 | Ikai | |
| 2019/0281294 A1 | 9/2019 | Kim | |
| 2019/0342557 A1 | 11/2019 | Robert | |

OTHER PUBLICATIONS

Office Action issued in U.S. Appl. No. 16/026,122 dated Dec. 12, 2019.

Notice of Allowance issued in U.S. Appl. No. 16/026,122 dated Jul. 15, 2020.

Office Action issued in Japanese Appln. No. 2017-132260 dated Oct. 23, 2020.

Bross. "High efficiency video coding (HEVC) text specification draft 8". Joint Collaborative Team on Video Coding (JCT-VC) of ITU-T SG16 WP3 and ISO/IEC JTC1/SC29/WG11. 10th Meeting: Stockholm, SE, Jul. 2012: 10, 15-24, 41-50, 67-68, 81-88. JCTVC-J1003_d5.

* cited by examiner (0,0)

| 0 | 1 | 4 | 5 | 16 | 17 | 20 | 21 |
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

FIG. 8

| REFERENCE INFORMATION | X COORDINATE OF MINIMUM CU | Y COORDINATE OF MINIMUM CU |
|---|---|---|
| 0 | 0 | 0 |
| 1 | 8 | 0 |
| 2 | 0 | 8 |
| 3 | 8 | 8 |
| ⋮ | ⋮ | ⋮ |
| 63 | 56 | 56 |

IMAGE PROCESSING APPARATUS THAT SPECIFIES A BLOCK TO BE ENCODED

BACKGROUND OF THE INVENTION

Field of the Invention

The present invention relates to an encoding technique.

Description of the Related Art

As an encoding method for compression recording of movies, H.265/HEVC (High Efficiency Video Coding) encoding method (hereinafter, HEVC) is known. In HEVC, an image of each frame that configures the movie is divided into blocks called CTUs (Coding Tree Units) by quadtree spatial splitting. In addition, it is possible to further subject a CTU to quadtree spatial splitting recursively. In HEVC, the block sizes that a CTU can take are 64×64, 32×32, and 16×16. In addition, the block sizes that a CU (coding unit) obtained by recursively subjecting a CTU to quadtree spatial splitting can take are 64×64, 32×32, 16×16, and 8×8. In HEVC, encoding processing is performed by taking a CU as a unit. Japanese Patent Laid-Open No. 2015-115903 discloses a technique for improving image quality while increasing encoding efficiency at a time of image fluctuation, in a compression technique where block size is variable.

In order to perform encoding processing for each CU included in a CTU, it is necessary to specify positioning of a CU that is an encoding target in the CTU. If the sizes of all CUs included in the CTU are the same, specification of the position of each CU is easy, but CUs having differing sizes can be included in the CTU. Using FIG. 1, description is given regarding such a case.

FIG. 1 illustrates a CTU having 64 vertical pixels×64 horizontal pixels, with the coordinate position (X coordinate, Y coordinate) of the upper left corner of the CTU=(0, 0), and the coordinate position (X coordinate, Y coordinate) of the bottom right corner=(63, 63). The CTU of FIG. 1 is divided into 13 CUs in accordance with recursive quadtree spatial splitting. Numbers 0 through 12 added to the CUs indicate a read order (encoding order) for the respective CU, and this is a so-called Morton order.

The CU to which the number "0" is added (referred to as CU0) has a size of 32 pixels×32 pixels, and a coordinate position of its upper left corner is (0, 0). The CUs to which the numbers "1" through "4" are added (respectively referred to as CU1 through CU4) each have a size of 16 pixels×16 pixels, and the coordinate positions of the upper left corners thereof are respectively (32, 0), (48, 0), (32, 16), and (48, 16). The CUs to which the numbers "5" through "8" are added (respectively referred to as CU5 through CU8) each have a size of 8 pixels×8 pixels, and the coordinate positions of the upper left corners thereof are respectively (0, 32), (8, 32), (0, 40), and (8, 40). The CUs to which the numbers "9" through "11" are added (respectively referred to as CU9 through CU11) each have a size of 16 pixels×16 pixels, and the coordinate positions of the upper left corners thereof are respectively (16, 32), (0, 48), and (16, 48). The CU to which the number "12" is added (referred to as CU12) has a size of 32 pixels×32 pixels, and a coordinate position of its upper left corner is (32, 32).

Here, in a case where CU0 is taken as a current encoding target, the CU to encode (read) next is CU1. An offset amount of the coordinate position of CU1 with respect to the coordinate position of CU0 is "+32" for the X coordinate, and "0" for the Y coordinate. At that point, a region of 16 pixels×16 pixels taking as an upper left corner a coordinate position resulting from adding these offset amounts to the coordinate position of CU0 is read as CU1. Next, in a case where CU2 is taken as a current encoding target, the CU to encode next is CU3. An offset amount of the coordinate position of CU3 with respect to the coordinate position of CU2 is "−16" for the X coordinate, and "+16" for the Y coordinate. At that point, a region of 16 pixels×16 pixels taking as an upper left corner a coordinate position resulting from adding these offset amounts to the coordinate position of CU2 is read as CU3. Next, in a case where CU4 is taken as a current encoding target, the CU to encode next is CU5. An offset amount of the coordinate position of CU5 with respect to the coordinate position of CU4 is "−48" for the X coordinate, and "+16" for the Y coordinate. At that point, a region of 8 pixels×8 pixels whose upper left corner is made to be a coordinate position resulting from adding these offset amounts to the coordinate position of CU4 is read as CU5. In this way, conventionally, in a case of reading and encoding each CU in a CTU, because offset amounts are not regular in accordance with the reading order or size of a CU, it is necessary to calculate the position of the CU to read next each time in accordance with its reading order or size, and processing is complicated.

SUMMARY OF THE INVENTION

The present invention was conceived in view of these kinds of problems, and provides a technique for reading CUs from a CTU at higher speed.

According to the first aspect of the present invention, there is provided an image processing apparatus, comprising: a specifying unit configured to specify a second block to be encoded after a first block, from among a plurality of blocks obtained by recursively dividing an image region in accordance with quadtree spatial splitting, based on a size of the first block; and an encoding unit configured to encode the second block.

According to the second aspect of the present invention, there is provided an image processing method that an image processing apparatus performs, the method comprising: specifying a second block to be encoded after a first block, from among a plurality of blocks obtained by recursively dividing an image region in accordance with quadtree spatial splitting, based on a size of the first block; and encoding the second block.

According to the third aspect of the present invention, there is provided a non-transitory computer-readable storage medium storing a computer program for causing a computer to function as a specifying unit configured to specify a second block to be encoded after a first block, from among a plurality of blocks obtained by recursively dividing an image region in accordance with quadtree spatial splitting, based on a size of the first block; and an encoding unit configured to encode the second block.

Further features of the present invention will become apparent from the following description of exemplary embodiments (with reference to the attached drawings).

BRIEF DESCRIPTION OF THE DRAWINGS

FIG. 8 is a view illustrating an example of a coordinate conversion table.

DESCRIPTION OF THE EMBODIMENTS

Below, explanation will be given for embodiments of present invention with reference to the accompanying drawings. Note that embodiments described below merely illustrate examples of specifically implementing the present invention, and are only specific embodiments of a configuration defined in the scope of the claims.

First Embodiment

Figure 2:
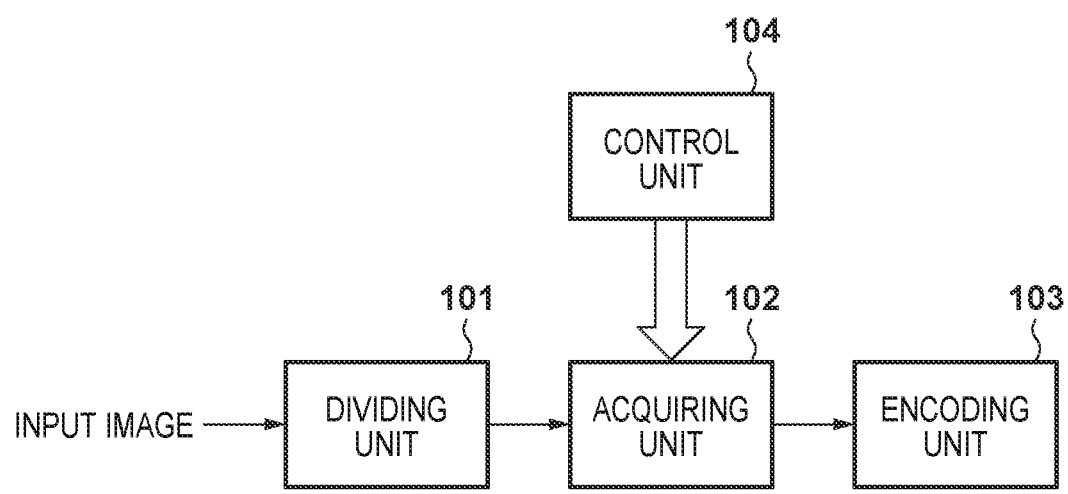
FIG. 2 is a block diagram for illustrating an example of a functional configuration of an image processing apparatus.

In the present embodiment, description is given regarding an image processing apparatus for encoding an image of each frame that configures a movie. Firstly, the block diagram of FIG. 2 is used to give a description regarding an example of a functional configuration of the image processing apparatus according to the present embodiment.

A dividing unit 101 acquires the image (an input image) of each frame that configures a movie, and recursively divides the input image in accordance with quadtree spatial splitting. The dividing unit 101 firstly divides the input image into a plurality of CTUs (Coding Tree Units) in accordance with quadtree spatial splitting, and further recursively subjects the CTUs to quadtree spatial splitting to thereby obtain CUs (Coding Units).

For each CTU divided by the dividing unit 101, an acquiring unit 102 reads the CUs that configure the CTU in an encoding order, and transmits them to an encoding unit 103. The encoding unit 103 encodes the CUs transmitted from the acquiring unit 102. A control unit 104 performs operation control of the entirely to the image processing apparatus that includes the dividing unit 101, the acquiring unit 102, and the encoding unit 103.

Figure 1:
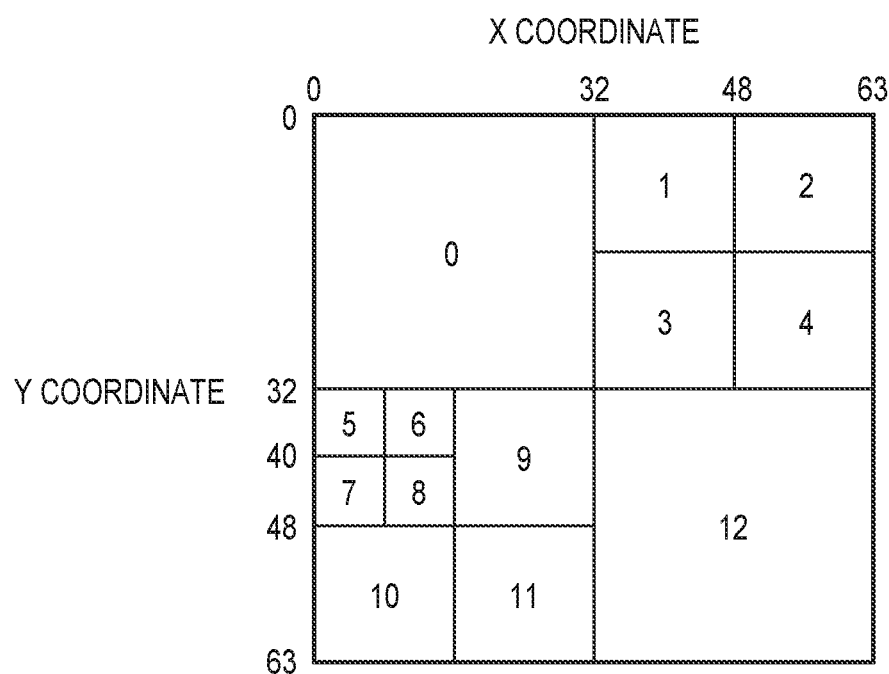
FIG. 1 is a view for describing an example of a configuration of a CTU.
Figure 3:
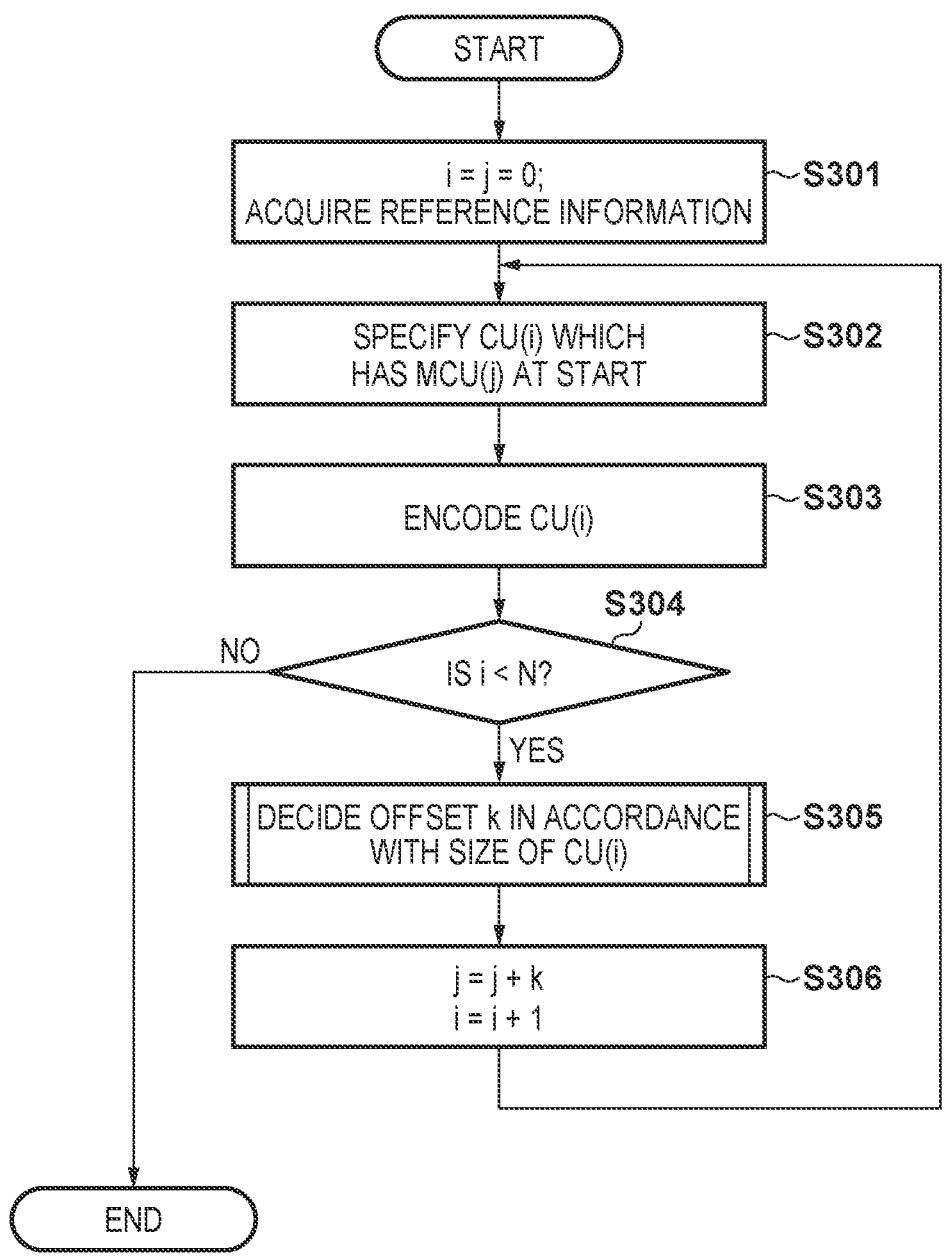
FIG. 3 is a flowchart of processing that the image processing apparatus performs to encode the CTU.

Next, description in accordance with the flowchart of FIG. 3 is given regarding processing that the image processing apparatus described above performs in order to encode one CTU. The flowchart of FIG. 3 indicates processing for encoding one CTU by the acquiring unit 102 and the encoding unit 103 when the acquiring unit 102 acquires one CTU from the dividing unit 101. Consequently, by performing processing in accordance with the flowchart of FIG. 3 for each CTU that configures one input image, the image processing apparatus can perform encoding with respect to the input image. As an example, description is given below assuming that the acquiring unit 102 has acquired the CTU illustrated in FIG. 1 from the dividing unit 101.

Figures 4, 5:
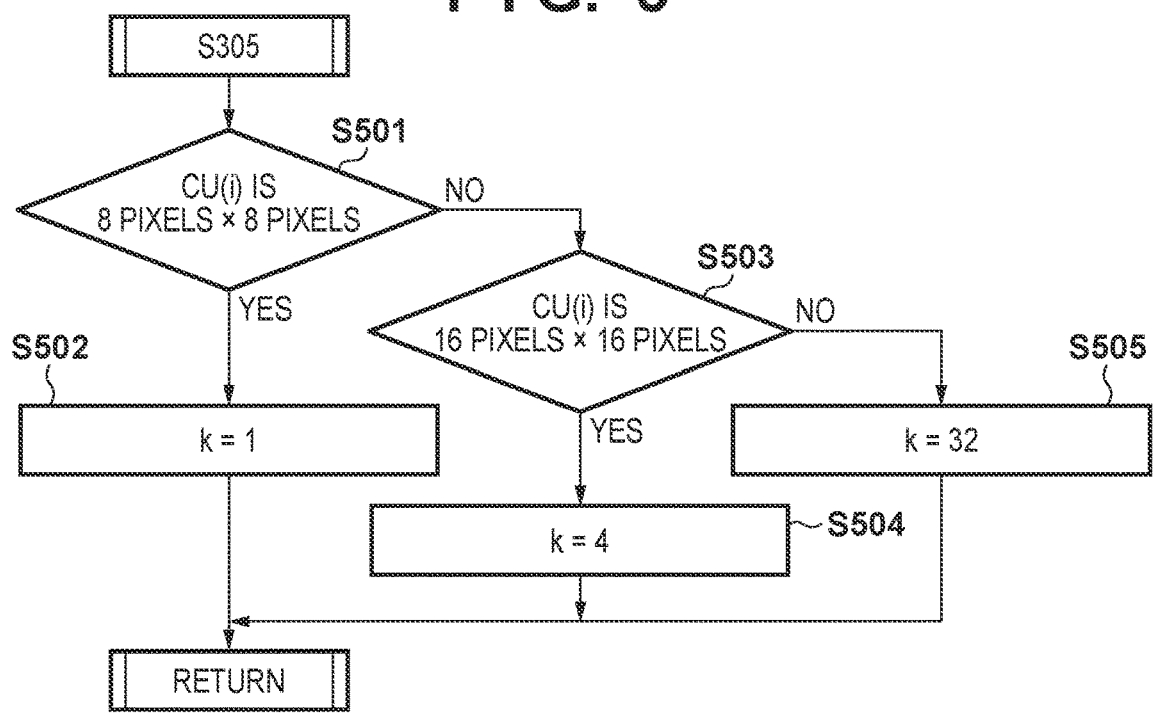
FIG. 4 is a view that illustrates reference information.
FIG. 5 is a flowchart illustrating detail of processing in step S305.

The image processing apparatus registers in advance, as reference information, an encoding order and a coordinate position for each CU for when all CUs in the CTU have the smallest size (8 pixels×8 pixels, referred to as a minimum CU) in quadtree spatial splitting, as illustrated by FIG. 4. The coordinate position of a minimum CU is the coordinate position of the upper left corner of the minimum CU in the CTU, for example. The encoding order is in accordance with a Morton order. Below, an i-th CU in the encoding order is represented as CU(i), and an j-th minimum CU in the encoding order defined by the reference information is represented as MCU(j).

In step S301, the control unit 104 initializes the values of a variable i and a variable j which are used in processing below to 0, and acquires the reference information. The reference information may be acquired from a memory (not shown) in the image processing apparatus, and may be acquired from an external apparatus.

In step S302, the acquiring unit 102 specifies CU(i) for which the minimum CU in its upper left corner is MCU(j) (CU(i) starting with MCU(j) in the encoding order defined by the reference information) from the CTU, acquires the specified CU(i) from the CTU, and outputs it to the encoding unit 103. At a point in time when processing has advanced from step S301 to step S302, i=j=0. Accordingly, in such a case, in step S302 the acquiring unit 102 acquires CU(0) having a size of 32 vertical pixels×32 horizontal pixels from the CTU and having a minimum CU in the upper left corner as MCU(0), and outputs CU(0) to the encoding unit 103. As described above, the coordinate position of the upper left corner of MCU(0) is (0, 0), and because the block size of CU(0) is 32 vertical pixels×32 horizontal pixels, an image region of 32 vertical pixels×32 horizontal pixels is acquired as CU(0) from the position of the upper left corner of the CTU. Similarly, CU(i) is acquired as an image region of P vertical pixels×Q horizontal pixels (P is the number of vertical pixels of CU(i) and Q is the number of horizontal pixels of CU(i)) from the position of the upper left corner of MCU(j).

In step S303, the encoding unit 103 performs encoding processing with respect to CU(i) which is outputted from the acquiring unit 102. For the encoding processing, two prediction encoding modes are employed: an inter-prediction encoding mode for performing inter prediction (prediction between screens, motion-compensated prediction) and an intra-prediction encoding mode for performing intra-prediction (prediction within a screen). The encoding unit 103 performs encoding (inter-prediction encoding/intra-prediction encoding) corresponding to a prediction encoding mode set by the control unit 104 out of these two prediction encoding modes. In either prediction encoding mode, "a series of processing such as intra prediction/inter prediction, quantization, and entropy encoding" are performed in units of CUs.

In step S304, the control unit 104 determines whether i<N. Here, N is the total number of CUs included in the CTU, and in the case of FIG. 1 N=13. As a result of this determination, because encoding has been performed for all CUs in the CTU if i≥N, processing in accordance with the flowchart of FIG. 3 ends for this CTU. Meanwhile, if i<N, the processing proceeds to step S305.

In step S305, the acquiring unit 102, when the setting the minimum CU in the upper left corner of CU(i+1) which is next to be encoded after CU(i) to MCU(j+k), decides the size (area) of CU(i) in accordance with the value of k (an offset). Description is given in accordance with the flowchart of FIG. 5 regarding details of the processing in step S305.

In step S501, the acquiring unit 102 determines whether the size of CU(i) is 8 pixels×8 pixels. As a result of this determination, if the size of CU(i) is 8 pixels×8 pixels the processing proceeds to step S502, and if the size of CU(i) is not 8 pixels×8 pixels, the processing proceeds to step S503.

In step S502, the acquiring unit 102 sets the offset k=1. If the size of CU(i) is 8 pixels×8 pixels which is the same as a minimum CU, the minimum CU one after the leading minimum CU of CU(i) in the encoding order defined by the reference information is the leading minimum CU of CU(i+1) in the encoding order defined by the reference information. Taking FIG. 4 as an example, when CU(i) is MCU(0), MCU(1) which is the minimum CU one after MCU(0) in the encoding order defined by the reference information is the leading minimum CU for CU(i+1) in the encoding order defined by the reference information. In this way, when a scaling ratio of the size of CU(i) with respect to the size of the minimum CU is 1, the offset k=1.

In step S503, the acquiring unit 102 determines whether the size of CU(i) is 16 pixels×16 pixels. As a result of this determination, if the size of CU(i) is 16 pixels×16 pixels the processing proceeds to step S504, and if the size of CU(i) is not 16 pixels×16 pixels, the processing proceeds to step S505.

In step S504, the acquiring unit 102 sets the offset k=4. If the size of CU(i) is 16 pixels×16 pixels which is four times the size of a minimum CU, the minimum CU four after the leading minimum CU of CU(i) in the encoding order defined by the reference information is the leading minimum CU of CU(i+1) in the encoding order defined by the reference information. Taking FIG. 4 as an example, it is assumed that the leading minimum CU of CU(i) in the encoding order defined by the reference information is MCU(0) (in such a case CU(i) is configured by MCU(0) through MCU(3)). In such a case, MCU(4) which is the minimum CU four after MCU(0) in the encoding order defined by the reference information is the leading minimum CU of CU(i+1) in the encoding order defined by the reference information. In this way, when a scaling ratio of the size of CU(i) with respect to the size of the minimum CU is 4, the offset k=4.

In step S505, the acquiring unit 102 sets the size of CU(i) to 32 pixels×32 pixels, and the offset k=16. If the size of CU(i) is 32 pixels×32 pixels which is 16 times the size of a minimum CU, the minimum CU 16 after the leading minimum CU of CU(i) in the encoding order defined by the reference information is the leading minimum CU of CU(i+1) in the encoding order defined by the reference information. Taking FIG. 4 as an example, it is assumed that the leading minimum CU of CU(i) in the encoding order defined by the reference information is MCU(0) (in such a case CU(i) is configured by MCU(0) through MCU(15)). In such a case, MCU(16) which is the minimum CU 16 after MCU(0) in the encoding order defined by the reference information is the leading minimum CU of CU(i+1) in the encoding order defined by the reference information. In this way, when a scaling ratio of the size of CU(i) with respect to the size of the minimum CU is 16, the offset k=16. Generally, letting the size (area) of a minimum CU be MS and the size (area) of CU(i) be S, the offset k is represented by S/MS.

Returning to FIG. 3, next, in step S306, the acquiring unit 102 adds the value of the offset k to the value of the variable j to update the value of the variable j (j=j+k), and adds 1 to the value of the variable i to update the value of the variable i (i=i+1). The processing returns to step S302.

Figure 7:
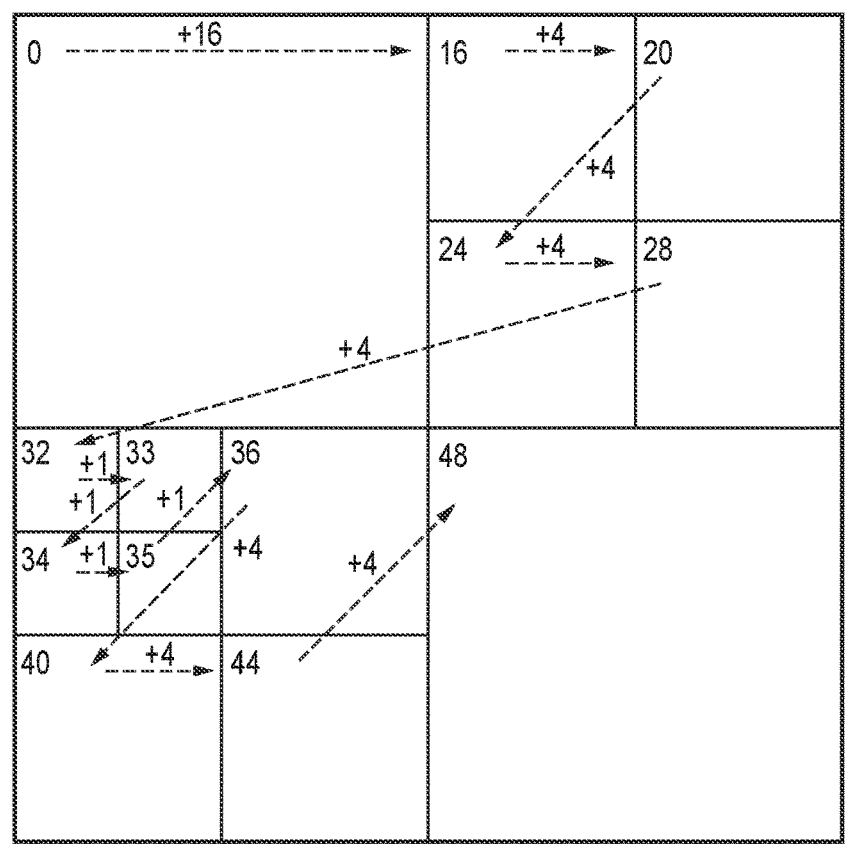
FIG. 7 is a view illustrating an example of operation processing of a first embodiment.

FIG. 7 is a view for illustrating a concrete example of operation of the present embodiment. Firstly, the size of the top-left CU is 32×32. Accordingly, when the size of the minimum CU is 8×8, the offset k=16, and the position of the CU to encode next is specified. Furthermore, the size of the CU to encode next is 16×16, the offset K=4, and the position of the CU to encode next is specified. In other words, the relationship between the offset K and the sizes of CU(0) through CU(12) is as follows.

CU(0): size 32×32, offset k=16
CU(1): size 16×16, offset k=4
CU(2): size 16×16, offset k=4
CU(3): size 16×16, offset k=4
CU(4): size 16×16, offset k=4
CU(5): size 8×8, offset k=1
CU(6): size 8×8, offset k=1
CU(7): size 8×8, offset k=1
CU(8): size 8×8, offset k=1
CU(9): size 16×16, offset k=4
CU(10): size 16×16, offset k=4
CU(11): size 16×16, offset k=4
CU(12): size 32×32, offset k=16

When the total of the offsets k becomes 64 which corresponds to the size of the CTU, the processing ends. Note that processing is performed after converting the position of each CU to XY coordinates using a coordinate conversion table as illustrated by FIG. 8.

Note that specific numerical values used in the present embodiment were used to give a description in detail, and the processing described above is not limited to the numerical values described above, and may have any numerical value. For example the size of a minimum CU is not limited to 8 pixels×8 pixels, and may be 4 pixels×4 pixels, and the size of a CTU is not limited to 64 pixels×64 pixels, and may be 32 pixels×32 pixels.

Regardless of what numerical values are taken for the size of CU (a block) or a minimum CU (sub block), a second block to encode after a first block is obtained as follows. That is, in a case of dividing a CTU which is an image region into a plurality of sub blocks having a minimum size, information (reference information) indicating an encoding order for each of the plurality of sub block is acquired. A sub block that follows, in the encoding order, the leading sub block of the first block in the encoding order by a number of sub blocks that accords to a scaling ratio (the size of the first block with respect to the size of the sub blocks) is specified. A second block that starts with the sub block specified in the encoding order is specified.

Second Embodiment

Figure 6:
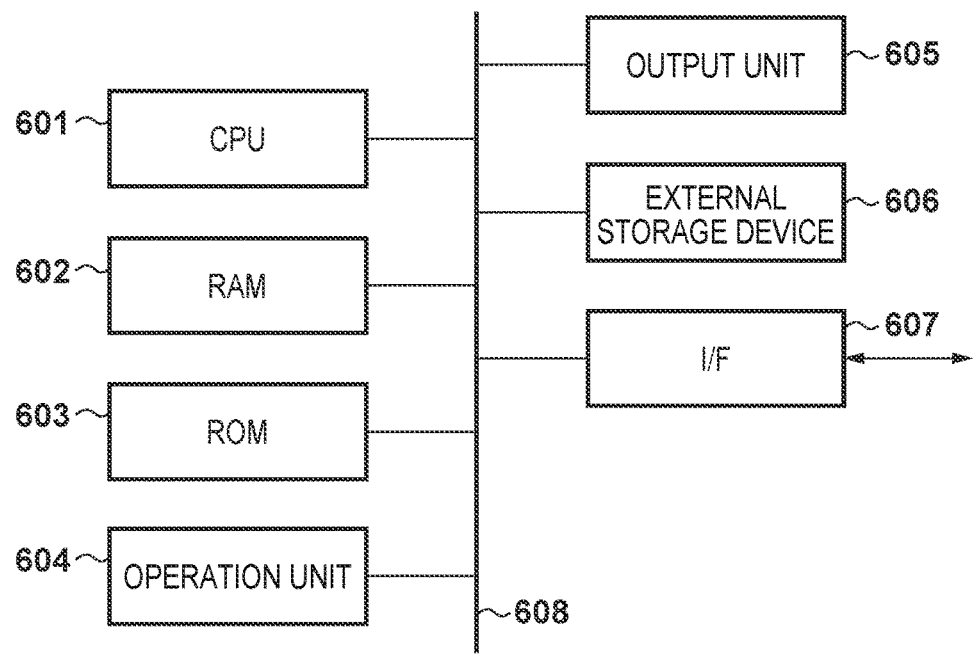
FIG. 6 is a block diagram for illustrating an example of a hardware configuration of a computer apparatus.

Each functional unit illustrated in FIG. 2 may be implemented as hardware, but it may be implemented as software (a computer program). In the former case, such hardware may be embedded in a computer apparatus such as a digital camera, a smart phone, a tablet terminal, or a network camera. In contrast, in the latter case, it is possible to apply a computer apparatus having a processor that can execute a computer program corresponding to each functional unit illustrated by FIG. 2 as the image processing apparatus described above. The block diagram of FIG. 6 is used to give a description regarding an example of a hardware configuration of a computer apparatus having a processor that can execute a computer program corresponding to each functional unit illustrated by FIG. 2.

A CPU 601 executes processing by using data and a computer program stored in a RAM 602 or a ROM 603. By this, the CPU 601 performs operation control of the computer apparatus as a whole, and executes or controls each process described above as something that the image processing apparatus performs.

The RAM 602 has an area for storing computer programs and data loaded from the ROM 603 or an external storage device 606 and data received from outside via an I/F (interface) 607. Furthermore, the RAM 602 also has a work area used when the CPU 601 executes various processing. In this way, the RAM 602 can appropriately provide various areas.

The ROM 603 stores a computer program (for example a boot program or a computer program for a BIOS) or data (for example, setting data of a computer apparatus) that does not need to be rewritten.

An operation unit 604 is configured by a user interface such as a mouse or a keyboard, and a user can input various instructions to the CPU 601 by operating it.

An output unit 605 is configured by a device such as a display device configured by a CRT, a liquid crystal screen, or the like, or a projection device for projecting an image or text onto a wall surface or the like, and displays/projects a processing result by the CPU 601 in accordance with an image, text, or the like. The display device may be a touch panel screen.

The external storage device 606 is a large capacity information storage device as typified by a hard disk drive device. The external storage device 606 stores an OS (operating system), as well as data or a computer program for causing the CPU 601 to execute the processing described above as something that the image processing apparatus performs. A computer program for causing the CPU 601 to realize the functionality of each functional unit illustrated in FIG. 2 is included in computer programs saved in the external storage device 606. In addition, the data saved in the external storage device 606 includes encoding parameters the encoding unit 103 uses in encoding, the reference information that is described above, or the like. A computer program or data saved in the external storage device 606 is appropriately loaded to the RAM 602 in accordance with control by the CPU 601, and becomes a target of processing by the CPU 601.

The I/F 607 is something that functions as an interface for performing data communication with an external device, and it is possible to connect the I/F 607 to an image capturing device that captures a movie, and acquire an image of each frame that configures this movie via the I/F 607, for example. In addition, the I/F 607 may include a network interface for connecting to a network such as a LAN or the Internet, and various information in the description above may be acquired from an external device via the I/F 607.

All of the CPU 601, the RAM 602, the ROM 603, the operation unit 604, the output unit 605, the external storage device 606, and the I/F 607 described above are connected to a bus 608. Note that the hardware configuration illustrated in FIG. 6 is merely an example of a hardware configuration of a computer apparatus that can be applied to the image processing apparatus described above.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-132260, filed Jul. 5, 2017, which is hereby incorporated by reference herein in its entirety.

What is claimed is:

1. An image processing apparatus, comprising:
a memory to register reference information to indicate an encoding order for a plurality of sub blocks each having a minimum size in a case where an image region is divided into the sub blocks each having the minimum size and coordinates of the plurality of the sub blocks each having the minimum size; and
one or more processors connected to one or more memories, the processors being configured to:
acquire an image to be encoded, the image being divided, in accordance with quadtree spatial splitting, into a plurality of blocks including a first block and a second block to be encoded after the first block;
specify a position of the second block to be encoded after the first block; and
encode the second block whose position is specified,
wherein the processors are configured to specify, based on the reference information, a sub block which corresponds to an upper left corner of the first block and is a leading sub block of the first block in the encoding order,
wherein the processors are configured to specify, as a position of the second block, a position of a k-th sub block from the specified sub block in the encoding order indicated by the reference information, using an offset of k, and
wherein the offset of k is represented by the relationship S/MS,
where MS is the size of a minimum coding unit (CU), and S the size of an i-th CU in the encoding order.

2. The image processing apparatus according to claim 1, wherein the encoding order is a Morton order corresponding to the plurality of sub blocks.

3. The image processing apparatus according to claim 1, wherein the processors are configured to: perform, with respect to the second block, prediction encoding in accordance with inter-prediction encoding for performing inter prediction or intra-prediction encoding for performing intra prediction.

4. The image processing apparatus according to claim 1, wherein the image region is a CTU (Coding Tree Unit) resulting from dividing an image in accordance with the quadtree spatial splitting.

5. The image processing apparatus according to claim 1, wherein each block obtained by recursively dividing the image region in accordance with the quadtree spatial splitting is a CU.

6. An image processing method that an image processing apparatus performs, the image processing apparatus including a memory to register reference information to indicate an encoding order for a plurality of sub blocks each having a minimum size in a case where an image region is divided into the sub blocks each having the minimum size and coordinates of the plurality of the sub blocks each having the minimum size, the method comprising:
  acquiring an image to be encoded, the image being divided, in accordance with quadtree spatial splitting, into a plurality of blocks including a first block and a second block to be encoded after the first block;
  specifying a position of the second block to be encoded after the first block; and
  encoding the second block whose position is specified,
  wherein the specifying includes specifying, based on the reference information, a sub block which corresponds to an upper left corner of the first block and is a leading sub block of the first block in the encoding order,
  wherein the specifying includes specifying, as a position of the second block, a position of a k-th sub block from the specified sub block in the encoding order indicated by the reference information, using an offset of k, and
  wherein the offset of k is represented by the relationship S/MS,
    where MS is the size of a minimum coding unit (CU), and S the size of an i-th CU in the encoding order.

7. A non-transitory computer-readable storage medium storing a computer program that, when executed by a computer, causes the computer to perform an image processing method for an image processing apparatus, the image processing apparatus including a memory to register reference information to indicate an encoding order for a plurality of sub blocks each having a minimum size in a case where an image region is divided into the sub blocks each having the minimum size and coordinates of the plurality of the sub blocks each having the minimum size, the method comprising:
  acquiring an image to be encoded, the image being divided, in accordance with quadtree spatial splitting, into a plurality of blocks including a first block and a second block to be encoded after the first block;
  specifying a position of the second block to be encoded after the first block; and
  encoding the second block whose position is specified,
  wherein the specifying includes specifying, based on the reference information, a sub block which corresponds to an upper left corner of the first block and is a leading sub block of the first block in the encoding order,
  wherein the specifying includes specifying, as a position of the second block, a position of a k-th sub block from the specified sub block in the encoding order indicated by the reference information, using an offset of k, and
  wherein the offset of k is represented by the relationship S/MS,
    where MS is the size of a minimum coding unit (CU), and S the size of an i-th CU in the encoding order.

* * * * *